US009823481B2

(12) United States Patent
Petrov et al.

(10) Patent No.: US 9,823,481 B2
(45) Date of Patent: Nov. 21, 2017

(54) BEAM COMBINING DEVICE HAVING A DIFFRACTIVE GRATING SURFACE

(71) Applicant: Huawei Technologies Co., Ltd., Shenzhen (CN)

(72) Inventors: Nikolay Ivanovich Petrov, Shenzhen (CN); Angela Liudvigovna Storozheva, Shenzhen (CN); Maksim Nikolaevich Khromov, Shenzhen (CN); Yury Mihaylovitch Sokolov, Shenzhen (CN); Vladislav Gennadievich Nikitin, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/185,947

(22) Filed: Jun. 17, 2016

(65) Prior Publication Data
US 2016/0299347 A1   Oct. 13, 2016

Related U.S. Application Data

(63) Continuation of application No. PCT/RU2013/001145, filed on Dec. 20, 2013.

(51) Int. Cl.
*G03B 21/20*   (2006.01)
*G02B 27/10*   (2006.01)
(Continued)

(52) U.S. Cl.
CPC ....... *G02B 27/1086* (2013.01); *G02B 5/1809* (2013.01); *G02B 5/1861* (2013.01);
(Continued)

(58) Field of Classification Search
CPC ............. G02B 27/0012; G02B 27/104; G02B 27/1086; G02B 5/1809; G02B 5/1861;
(Continued)

(56) References Cited

U.S. PATENT DOCUMENTS 7,445,339 B2   11/2008   Dvorkis et al.
7,883,214 B2   2/2011   He et al.
(Continued)

FOREIGN PATENT DOCUMENTS

EP   1351522 A2   10/2003

OTHER PUBLICATIONS

Foreign Communication From a Counterpart Application, PCT Application No. PCT/RU2013/001145, English Translation of International Search Report dated Sep. 25, 2014, 5 pages.
(Continued)

*Primary Examiner* — Sultan Chowdhury
*Assistant Examiner* — Magda Cruz
(74) *Attorney, Agent, or Firm* — Conley Rose, P.C.

(57) ABSTRACT

The present application discloses a beam combining device, which includes a reflective diffractive grating surface configured to combine a first, a second and a third incident light beam having different colors to a single diffracted mixed-color light beam when impinging on the reflective diffractive grating surface, wherein a profile of the grating surface is configured according to an optimization criterion with respect to a diffraction efficiency.

19 Claims, 7 Drawing Sheets

(51) Int. Cl.
*G02B 5/18* (2006.01)
*G02B 27/14* (2006.01)
*G02B 27/00* (2006.01)
*H04N 9/31* (2006.01)
*G02B 26/10* (2006.01)
*G03B 33/06* (2006.01)

(52) U.S. Cl.
CPC ....... *G02B 27/0012* (2013.01); *G02B 27/104* (2013.01); *G02B 27/14* (2013.01); *H04N 9/3129* (2013.01); *H04N 9/3158* (2013.01); *H04N 9/3161* (2013.01); *H04N 9/3164* (2013.01); *H04N 9/3173* (2013.01); *G02B 26/101* (2013.01); *G03B 21/2033* (2013.01); *G03B 33/06* (2013.01)

(58) Field of Classification Search
CPC .... G02B 26/101; G02B 27/14; H04N 9/3129; H04N 9/3158; H04N 9/3161; H04N 9/3164; H04N 9/3173; G03B 21/2033; G03B 33/06
See application file for complete search history.

(56) References Cited

U.S. PATENT DOCUMENTS

| | | |
|---|---|---|
| 7,891,817 B2 | 2/2011 | Iwasaki |
| 2002/0191394 A1 | 12/2002 | Coleman et al. |
| 2003/0189742 A1* | 10/2003 | Kobayashi ........... G02B 26/101 359/202.1 |
| 2008/0225291 A1* | 9/2008 | Konno ..................... G01J 3/04 356/328 |
| 2009/0267088 A1 | 10/2009 | Peng et al. |
| 2013/0292571 A1 | 11/2013 | Mukherjee et al. |

OTHER PUBLICATIONS

Foreign Communication From a Counterpart Application, PCT Application No. PCT/RU2013/001145, English Translation of Written Opinion dated Sep. 25, 2014, 7 pages.

* cited by examiner

BEAM COMBINING DEVICE HAVING A DIFFRACTIVE GRATING SURFACE

CROSS-REFERENCE TO RELATED APPLICATION

This application is a continuation of International Application No. PCT/RU2013/001145, filed on Dec. 20, 2013, which is hereby incorporated by reference in its entirety.

TECHNICAL FIELD

The present disclosure relates to a beam combining device having a diffractive grating surface. In one embodiment, the diffractive grating surface includes a compact unit with specially designed diffractive grating for combining red, green and blue laser beams into one. The disclosure further relates to a laser scan pico-projector including a beam combining device and a method for generating a mixed color light beam. The disclosure generally relates to the field of laser pico-projection illumination technologies.

BACKGROUND

Laser scanning techniques allow the creation of high quality micro projection devices for insertion into mobile devices such as mobile phones, smartphones, laptops, etc. The main merits of laser scanning projection methods are a small size of light sources, a good color gamut and a small size of the spatial light modulator, without needed imager matrices like liquid crystal matrices or DLP (digital light processing). One of the main difficulties of laser scanning is the exact combining of red, green and blue laser beams into one beam in order to create a point of the image in designed coordinates on the screen.

Figure 1:
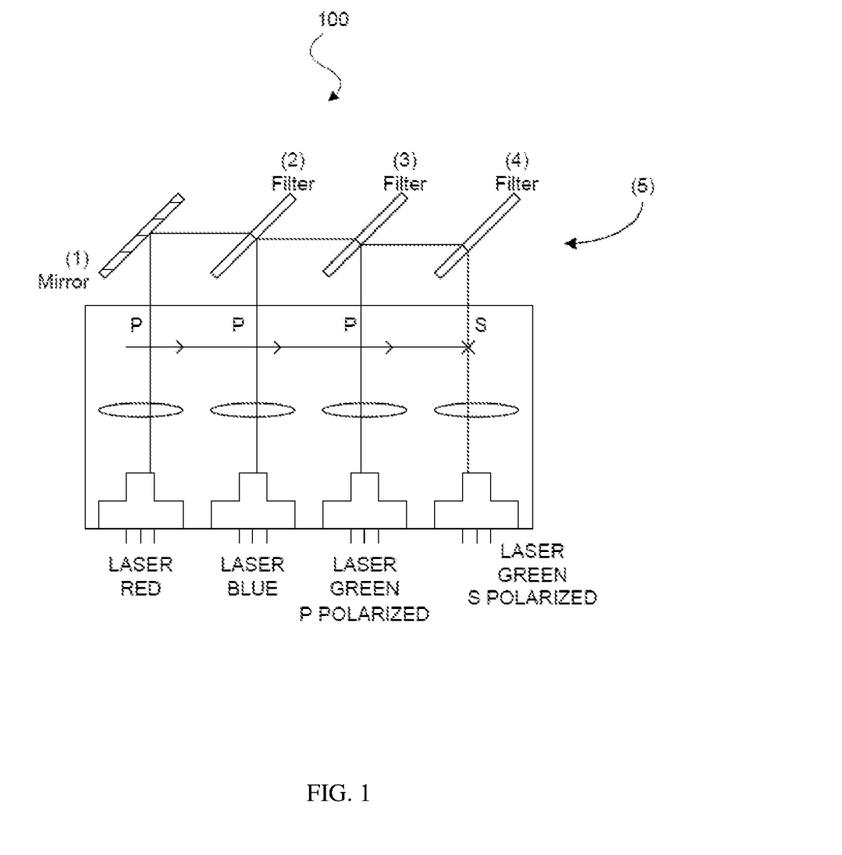
FIG. 1 shows a schematic diagram illustrating combining of red, green and blue laser beams into the one RGB color controlled light beam.

Laser scanning projection techniques use two or more dichroic mirrors for a combination of three light beams of different colours, e.g. red, blue and green or any other colour, into one light beam of mixed colour such as white with similar intensity. Generally dichroic and polarizing mirrors 1, 2, 3, 4 may be used for combining three laser beams as can be seen from FIG. 1 and in U.S. Pat. No. 7,445,339. FIG. 1 illustrates the combining of red, green and blue laser beams into the one red, green, blue (RGB) color controlled light beam 5. Dispersive optical elements are suggested for the beam-combining. A dispersive optical element is an element that spreads out light beams with output directions depending on their wavelengths. If incoming light beams impinge on a dispersive element with specific directions, a mixed light beam may arise from the dispersive optical element.

Figure 2:
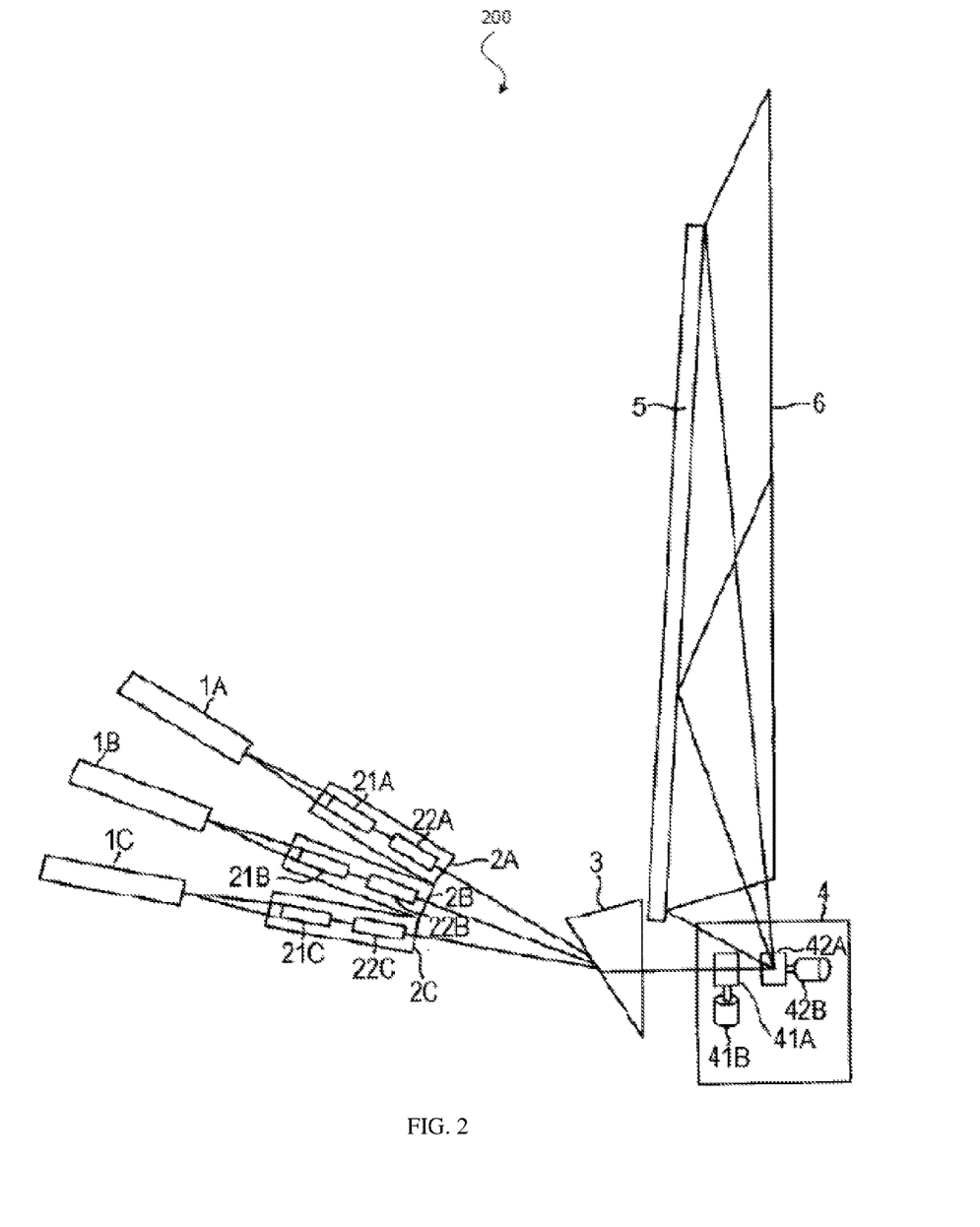
FIG. 2 shows a schematic diagram illustrating the general structure of a laser projection system with a dispersive light beam combiner element in form of a prism.

FIG. 2 illustrates the general structure of a laser projection system 200 with a dispersive light beam combiner element 3 in form of a prism. The general structure of a laser projection system is also shown in U.S. Pat. No. 7,891,817. The red, green and blue light beams of three (red, green and blue) light sources 1A, 1B and 1C pass respective optical units 2A, 2B, 2C that include beam-shaping optical elements 21A, 21B, 21C and beam-converting optical elements 22A, 22B, 22C before the light beams arrive at the prism 3 that combines the light beams to a single light beam projected onto a screen 6. A scanning unit 4 including reflecting mirrors 41A, 42A and scan driving portions 41B, 42B scans the light and controls projection via a light-guiding mirror 5 onto the screen 6.

Figure 3:
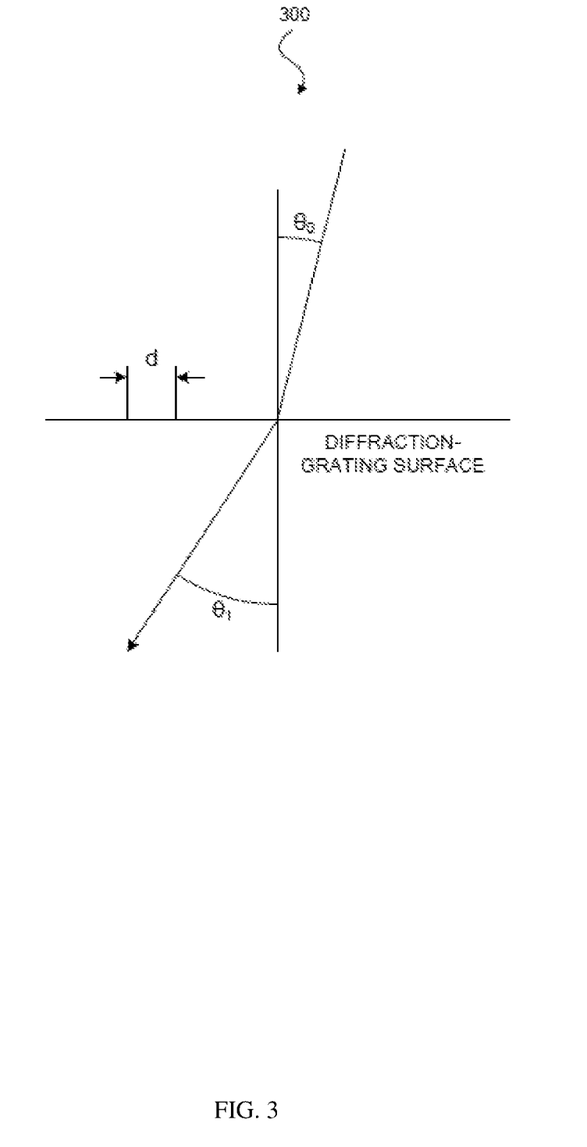
FIG. 3 shows a schematic diagram illustrating the principle of transmittance diffractive grating working with angles calculations.

FIG. 3 illustrates the principle of transmittance diffractive grating working with angles calculations, which is also further described in U.S. Pat. No. 7,891,817. The illustration of FIG. 3 shows light beam propagation through light-transmittance diffractive grating for calculation of the incident beam angle $\theta_0$. The incident light beam with incident beam angle $\theta_0$ with respect to normal direction is refracted at the diffractive grating surface and passes through the diffractive grating with an emergent beam angle $\theta_1$ with respect to normal that is greater than the incident beam angle.

Optical projection systems as described above use general dispersive elements or arrangements of multiple mirrors and scan driving portions. General dispersive optical elements are prisms and transmittance diffractive gratings (DGs). Prisms and transmittance diffraction gratings are volumetric elements, therefore they do not allow a sufficient decreasing of the total size of the RGB beam combiner. Analogously, arrangements of multiple mirrors and scan driving portions consume a lot of space inside the projection system. Pico-projection systems have strict size requirements, for example their size should not be more than a few $cm^3$. Therefore, there is a need to reduce the size of such devices.

SUMMARY

It is the object of the embodiment of the application to provide a compact device for combining different coloured light beams into one mixed coloured light beam.

This object is achieved by the features of the independent claims. Further implementation forms are apparent from the dependent claims, the description and the figures.

The embodiment of the application is based on the finding that using a reflective specially profiled diffractive grating for efficiently combining three light beams, the illumination unit size can be decreased. The reflective grating is optimized with respect to maximum efficiency in combining the three light beams to one single light beam.

According to a first aspect, the embodiment of the application relates to a beam combining device comprising a reflective diffractive grating surface configured to combine a first, a second and a third incident light beam having different colors to a single diffracted mixed-color light beam when impinging on the reflective diffractive grating surface, wherein a profile of the grating surface is configured according to an optimization criterion with respect to a diffraction efficiency.

When the profile of the grating surface is configured according to an optimization criterion with respect to diffraction efficiency, the number of optical elements can be reduced with high efficiency. Because of the optimized diffraction efficiency, the size of the beam combining device can be reduced. A single surface can be used where the mixing of the three light beams is performed. No additional optical devices such as dichroic mirrors or prisms are needed.

In a first possible implementation form of the beam combining device according to the first aspect, the reflective diffractive grating surface comprises a blazed grating.

Diffraction efficiency of blazed gratings may be higher than 90%.

In a second possible implementation form of the beam combining device according to the first implementation form of the first aspect, the blazed grating comprises grooves having asymmetric form, such as asymmetric triangular form.

Due to the asymmetric form of the blazed grating diffraction efficiency is improved.

In a third possible implementation form of the beam combining device according to the first aspect, the reflective diffractive grating surface comprises a sub-wavelength grating.

Diffraction efficiency of subwavelength gratings may be higher than 90%.

In a fourth possible implementation form of the beam combining device according to the third implementation form of the first aspect, the sub-wavelength grating comprises grooves arranged on the grating surface with a period of less than a wavelength of one of the three incident light beams.

Grooves on the grating surface with a period of less than a wavelength may increase the diffraction efficiency.

In a fifth possible implementation form of the beam combining device according to the fourth implementation form of the first aspect, the grooves of the sub-wavelength grating have a symmetric triangular or a sinusoidal form.

For subwavelength grating, a symmetric form can be used to increase the diffraction efficiency. The symmetric form can be easily manufactured.

In a sixth possible implementation form of the beam combining device according to the first aspect as such or according to any of the preceding implementation forms of the first aspect, the grating surface comprises a reflective metalized grating, such as a metal layer covering the grating surface.

The reflective metalized grating increases the power of the diffracted emitting light beam, as no optical losses can happen by transmittance through the grating.

In a seventh possible implementation form of the beam combining device according to the first aspect as such or according to any of the preceding implementation forms of the first aspect, the profile of the grating surface is curved, such as concave.

Curved grating surfaces allow correction of initial light beams divergence. Curved grating surfaces allow reducing the number of optical elements and allow creating more compact devices.

In an eighth possible implementation form of the beam combining device according to the first aspect as such or according to any of the preceding implementation forms of the first aspect, the optimization criterion is based on at least one of the following parameters: angles of the incident light beams ($\theta_1$) to normal, an angle of the diffracted light beam ($\theta_w$) to normal, wavelengths ($\lambda_i$) of the incident light beams, a diffractive order number (m), and a grating period (T) of the grating surface.

These parameters are known by design or can be easily measured.

In a ninth possible implementation form of the beam combining device according to the eighth implementation form of the first aspect, the optimization criterion is based on the relation:

$$\sin\theta_i + \sin\theta_w = \frac{m\lambda_i}{T},$$

where $\theta_i$ denotes the angle of the i-th incident light beam to normal, i=1, 2, 3, $\theta_w$ denotes the angle of the diffracted light beam to normal, $\lambda_i$ denotes the wavelength of the i-th incident light beam, i=1, 2, 3, i is a positive integer, m denotes the diffractive order number, and T denotes the grating period of the grating surface.

The optimization criterion can be determined according to the general diffractive grating equation. Design of grating profiles can be easily reproduced when using that relation. Diffractive gratings can thus be flexibly manufactured depending on the specific optical environment.

In a tenth possible implementation form of the beam combining device according to the ninth implementation form of the first aspect, the diffractive order number m is equal to minus one, or negative one.

When using a diffractive order of m=−1 mixing of the designed "white" light beam with zero orders of initial RGB laser beams can be avoided. The efficiency of the color design for the emitting light beam can be improved.

In an eleventh possible implementation form of the beam combining device according to any of the eighth to the tenth implementation forms of the first aspect, the grating period T of the grating surface lies in a range of approximately 2500 lines per millimeter.

Such a range results in subwavelength grating for Blue laser light (450 nanometers [nm]), Green laser light (532 nm) and Red laser light (640 nm) resulting in improved diffraction efficiency.

In a twelfth possible implementation form of the beam combining device according to any of the eighth to the eleventh implementation forms of the first aspect, the wavelengths $\lambda_i$ of the incident light beams correspond to wavelengths of red, green and blue laser light.

The diffractive grating having such a profile can be used in a laser scan projector having improved diffractive efficiency.

According to a second aspect, the embodiment of the application relates to a laser scan pico-projector, comprising a first, a second and a third laser configured to generate a first, a second and a third incident light beam, respectively, the incident light beams having different colors, and a beam combining device according to the first aspect as such or according to any of the preceding implementation forms of the first aspect, wherein the first, second and third lasers are arranged such that the first, second and third incident light beams are directed to the reflective diffractive grating surface of the beam combining device.

When the profile of the grating surface is configured according to an optimization criterion with respect to diffraction efficiency, the number of optical elements can be reduced with high efficiency and the size of the laser scan pico-projector can be reduced. The laser scan pico-projector can use a single surface for mixing of the three light beams.

According to a third aspect, the embodiment of the application relates to a method for generating a mixed-color light beam based on a combination of a first, a second and a third incident light beam, the method comprising arranging the first, second and third incident light beams with respect to a reflective diffractive grating surface, such as, a reflective diffractive grating surface of a beam combining device according to the first aspect as such or according to any of the preceding implementation forms of the first aspect, according to the relation:

$$\theta_i = \arcsin\left(\frac{m\lambda_i}{T} - \sin\theta_w\right)$$

where $\theta_i$ denotes an angle of the i-th incident light beam to normal, i=1, 2, 3, $\theta_w$ denotes an angle of the mixed-color light beam to normal, $\lambda_i$ denotes a wavelength of the i-th incident light beam, i=1, 2, 3, m denotes a diffractive order number, and T denotes a grating period of the grating surface.

By applying such optimization criterion, the method allows mixing of light with high diffraction efficiency and high output power.

According to a fourth aspect, the embodiment of the application relates to a compact device based on reflective blazed diffractive grating with optimized profile for combining of collimated light beams with red, green, blue colors into single light beam for laser scan picoprojectors.

Such a device is compact and allows combining of different coloured light beams into one mixed coloured light beam in a very efficient manner. Diffraction efficiency of blazed gratings may be higher than 90%.

According to a fifth aspect, the embodiment of the application relates to a compact device based on reflective subwavelength diffractive grating with optimized profile for combining of collimated light beams with red, green, blue colors into single light beam for laser scan picoprojectors.

Such a device is compact and allows combining of different coloured light beams into one mixed coloured light beam in a very efficient manner. Diffraction efficiency of subwavelength gratings may be higher than 90%.

According to a fourth aspect, the embodiment of the application relates to a compact device based on designed reflective blazed or subwavelength diffractive grating having curvature for beam form correction with optimized profile for combining of light beams with red, green, blue colors into single light beam with particularly collimation for laser scan picoprojectors.

Such a device is compact and allows combining of different coloured light beams into one mixed coloured light beam in a very efficient manner. Diffraction efficiency of blazed or subwavelength gratings may be higher than 90%. Curved grating surfaces allow correction of initial light beams divergence. Curved grating surfaces allow reducing the number of optical elements and allow creating a more compact device.

DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

The devices and methods described herein may be based on diffractive grating, such as reflective diffractive grating. It is understood that comments made in connection with a described method may also hold true for a corresponding device configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless noted otherwise.

Figure 4:
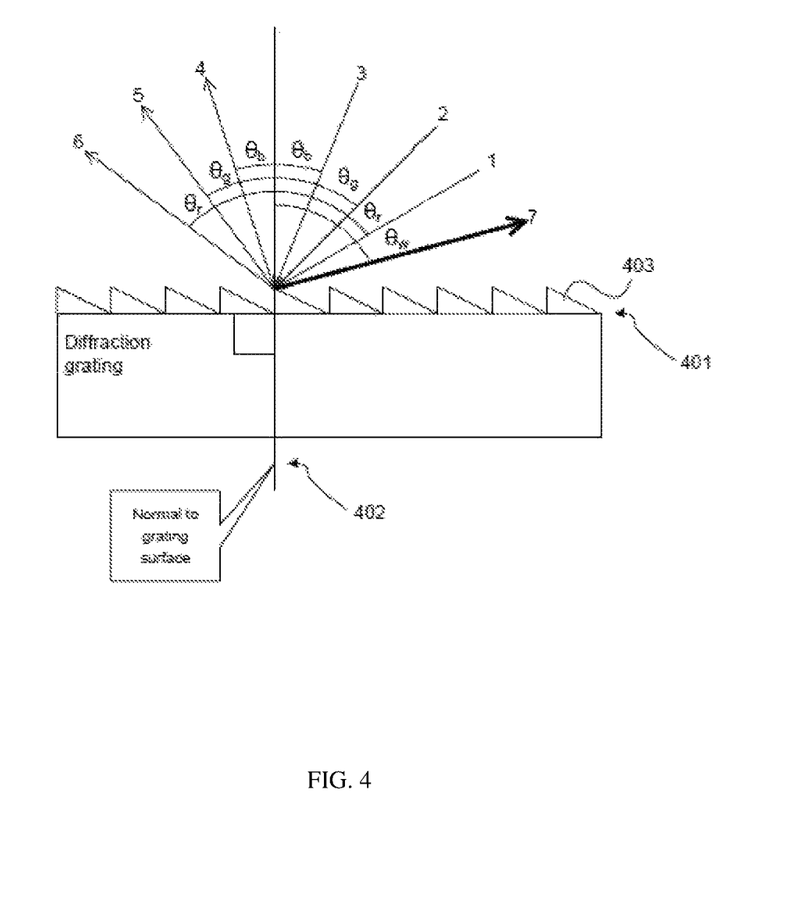
FIG. 4 shows a schematic diagram illustrating a beam combining device including a reflective diffractive grating surface for combining red, green and blue light beams into a single white light beam according to an implementation form.

FIG. 4 shows a schematic diagram illustrating a beam combining device 400 including a reflective diffractive grating surface for combining red, green and blue light beams into a single white light beam according to an implementation form.

The beam combining device 400 may include a reflective diffractive grating surface 401 to combine a first incident light beam 1, a second incident light beam 2 and a third incident light beam 3 having different colors, e.g. blue, green and red into a single diffracted mixed-color light beam 7 when impinging on the reflective diffractive grating surface 401. A profile 403 of the grating surface 401 is designed according to an optimization criterion with respect to diffraction efficiency. The first incident light beam 1, a second incident light beam 2 and a third incident light beam 3 may be reflected from the reflective diffractive grating surface 401. The grating surface 401 may be highly reflective, similar to a mirror. No energy or only a small energy portion of the incident light beams is lost due to transmittance through the grating surface 401. Thus, an energy efficiency of the beam combining is high. In one example, the grating surface 401 is covered with a metal layer or some other layer having mirroring properties to improve the reflective property of the grating surface 401. In one example, the metal layer or the layer having mirroring properties is embedded in the grating surface.

By optimally designing the profile 403 of the grating surface 401, diffractive gratings can be designed to=o provide amplitude diffraction efficiencies higher than 15% and phase diffraction efficiencies higher than 41% for first order binary profiles, higher than 31% for first order sinusoidal profiles, higher than 60% for first order blazed profiles and higher than 60% for first order subwavelength profiles.

In an implementation form, the reflective diffractive grating surface 401 may include a blazed grating. In an implementation form, the blazed grating may have grooves having an asymmetric form, such as an asymmetric triangular form. In an implementation form, the reflective diffractive grating surface 401 may include a sub-wavelength grating. In an implementation form, the sub-wavelength grating may have grooves arranged on the grating surface 401 with a period of less than a wavelength of one of the three incident light beams 1, 2, 3. In an implementation form, the grooves of the sub-wavelength grating may have a symmetric triangular or a sinusoidal form.

The efficiency of diffractive grating may depend on the quality of the profile 403, on the wavelength and on the depth of the profile 403. Efficiency of blazed or subwavelength gratings may be higher than 90%. Blazed gratings may define gratings with grooves having asymmetric triangular form. Subwavelength gratings may define gratings with the period of grooves being less than a wavelength. The grooves may have symmetric triangular or sinusoidal form.

The highest efficiency for red, green and blue light sources simultaneously can be achieved when optimizing the profile 403 of the grating 401. Subwavelength gratings may be preferable because their diffraction angle increases when decreasing the grating period as can be seen from the general diffractive grating equation (1) described below. An increasing of the diffraction angle may be needed for placement of laser sources.

In an implementation form, the grating surface 401 may include a reflective metalized grating, such as a metal layer covering the grating surface 401. A reflective metalized grating may be preferable because its utilizing allows avoiding light energy loss on transparent surfaces.

The general diffractive grating equation:

$$\sin\theta_i + \sin\theta_w = \frac{m\lambda_i}{T} \quad (1)$$

describes a relation between the angles $\theta_i$, i=1, 2, 3, . . . normal 402 of the incident light beams 1, 2, 3 to normal 402, an angle $\theta_w$ of the diffracted light beam 7 to normal 402, wavelengths $\lambda_i$ of the incident light beams 1, 2, 3, a diffractive order number m and a grating period T of the grating surface 401.

$\theta_i$ may be denoted as the angle to normal 402 of red, green and blue incident light beams, where i may be an index for r, g, b, i.e. for a red incident light beam 1, green incident light beam 2 and blue incident light beam 3 respectively. $\theta_w$ may be denoted as the angle to normal direction 402 of the output combined ("white") light beam 7. $\lambda_i$ may be denoted as the wavelength for the red incident light beam 1, green incident light beam 2 and blue incident light beam 3 light beams, respectively. The diffractive order number m may obtain the values m=±1, ±2, ±3, ±4, . . . .

In one example, positive diffractive orders (m=+1, +2, . . . ) may be in the opposite to incident beams 1, 2, 3 half-space relative to the normal 402. Negative orders (m= −1, −2, . . . ) may be in the same half-space with incident beams 1, 2, 3 relative to the normal 402. $\theta_w$ may be determined as a constant value and $\lambda_r$, $\lambda_g$, $\lambda_b$ may also be constants because they are determined by the light sources. Therefore the angle of incidence for each RGB light beam 1, 2, 3 may be written as:

$$\theta_i = \arcsin\left(\frac{m\lambda_i}{T} - \sin\theta_w\right) \quad (2)$$

A reflective diffractive grating with optimized profile may be used for combination of red, green, and blue laser beams into a single beam. In an implementation form, a diffractive order of m=−1 is used in order to avoid mixing of designed "white" light beam 7 with zero orders of initial RGB laser beams 1, 2, 3. Replacing m=−1 in equation (2) results in:

$$\theta_i = \arcsin\left(-\frac{\lambda_i}{T} - \sin\theta_w\right) \quad (3)$$

In one example, zero orders may be used for feedback control of light sources.

The diffraction efficiency for diffractive gratings may depend on depth and quality of the phase profile of the diffractive grating on the one hand. In one embodiment, the diffractive efficiency may depend on the wavelength and polarization of light. When using deeply optimized diffractive grating profiles 403, the maximal efficiency of diffracted light with three wavelengths into the designed order can be achieved.

Deeply optimized diffractive grating profiles 403 may be provided by optimizing the grating profile according to equations (2) or (3), i.e. the optimization criterion may be based on equation (2) or equation (3).

In an implementation form, the profile 403 of the grating surface 401 may be curved, such as concave as described below with respect to FIG. 5.

In an implementation form, the grating period T of the grating surface may lie in a range of approximately 2500 lines per millimeter (mm).

In an implementation form, the wavelengths $\lambda_i$ of the incident light beams 1, 2, 3 may correspond to wavelengths of red, green and blue laser light, e.g. 450 nm (nanometer) for blue laser light, 532 nm (nanometer) for green laser light and 640 nm (nanometer) for red laser light. Applying equation (2) may result in exemplary incident angles for the three light beams of approximately $\theta_3 \approx 9.7°$ for the blue light beam 3, approximately $\lambda_2 \approx 22°$ for the green light beam 2, approximately $\theta_1 \approx 40°$ for the red light beam 1 and approximately $\theta_w \approx 72°$ for the white emitting light beam 7.

Although FIG. 4 depicts three incident light beams, the beam combining device is not limited to three light beams such as RGB light beams. In examples, any other number of light sources can also be combined by the beam combining device 400, e.g. 2 light beams, 4, 5, 6, 7, etc. light beams. The colors are not limited to red, green and blue. In examples, different colors are used to create a mixed color light beam. The mixed color light beam does not necessarily have to be a white color light beam. In one example, the light beams 1, 2, 3 may be generated by lasers. In one example, the light beams 1, 2, 3 may be generated by light emitting diodes (LEDs).

Figure 5:
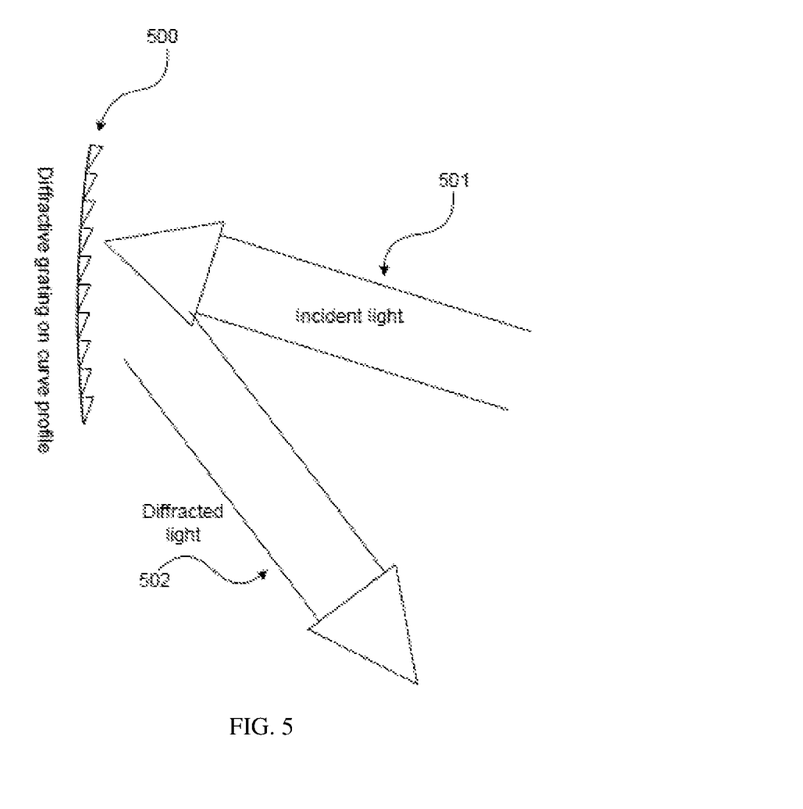
FIG. 5 shows a schematic diagram illustrating a reflective diffractive grating surface with a curved profile according to an implementation form.

FIG. 5 shows a schematic diagram illustrating a reflective diffractive grating surface 500 with a curved profile according to an implementation form.

For correcting the divergence of incident light 501 on a grating surface from laser diodes or LEDs, a curvature may be applied to the grating surface. The curved grating surface 500 may reduce this divergence. The curvature may be shaped concave. The curved grating surface 500 may focus the emergent light beam 502.

Figure 6:
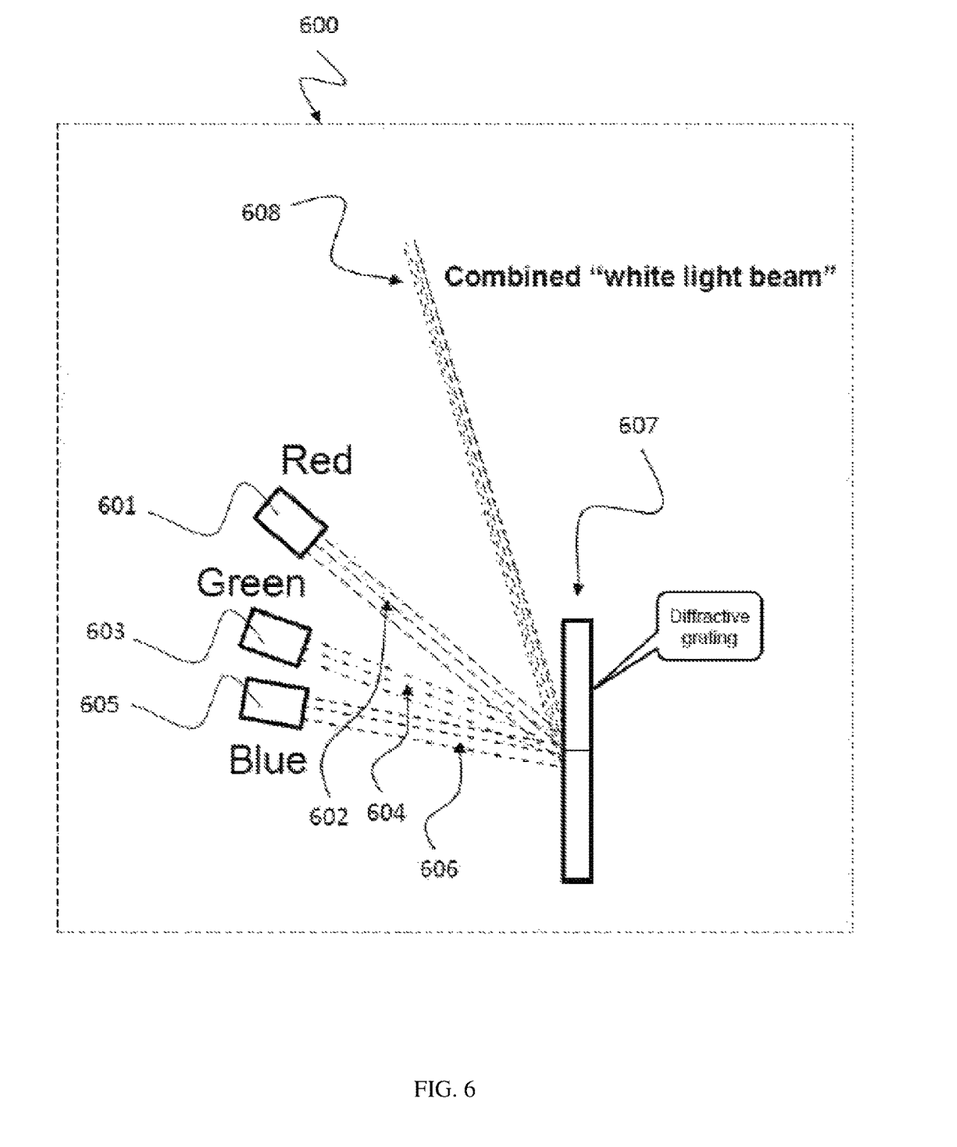
FIG. 6 shows a schematic diagram illustrating a laser scan pico-projector illumination part according to an implementation form.

FIG. 6 shows a schematic diagram illustrating a laser scan pico-projector illumination part 600 according to an implementation form. The laser scan pico-projector illumination part 600 may include a first laser 601, a second laser 603 and a third laser 605 generating a first incident light beam 602, a second incident light beam 604 and a third incident light beam 606, respectively. The incident light beams may have different colors, e.g. such as red, green and blue as exemplary illustrated in FIG. 6. The laser scan pico-projector illumination part 600 may include a beam combining device 400 as described above with respect to FIG. 4, such as a beam combining device 500 having a curved surface as depicted in FIG. 5. The first laser 601, second laser 603 and third laser 605 may be arranged such that the first incident light beam 602, second incident light beam 604 and third incident light beam 606 are directed to the reflective diffractive grating surface of the beam combining device as depicted in FIG. 6. The arrangement may be designed according to equation (2) or (3) described above.

The combining of the red, green and blue light beams into one combined light beam 608 has been modeled by a ZEMAX simulation. An exemplary parameter set may be the following: grating period 2500 lines per mm, the angles from normal may be for blue laser light (450 nm)≈9.7°, for green laser light (532 nm)≈22°, for red laser light (640 nm)≈40°, for the resulting ("white") laser beam≈72°.

The results of the simulation demonstrate good performance of combining of the three light beams with different colors into one for providing a light beam with designed color (RGB) for image projection techniques.

The devices presented in this disclosure may be employed into laser scan pico-projector systems creating light beams with designed colour and intensity and may thus replace conventional image projection techniques which are using two or more dichroic mirrors.

Figure 7:
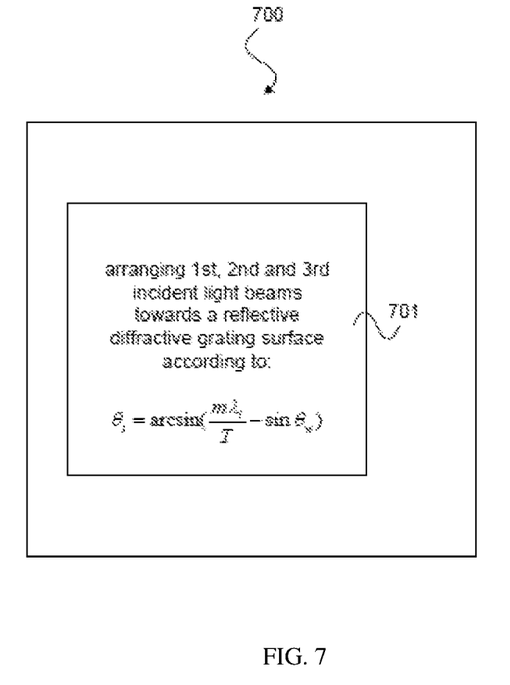
FIG. 7 shows a schematic diagram illustrating a method for generating a mixed-color light beam according to an implementation form.

FIG. 7 shows a schematic diagram illustrating a method 700 for generating a mixed-color light beam according to an implementation form.

The method 700 may include arranging 701 a first, second and third incident light beam with respect to a reflective diffractive grating surface according to the relation:

$$\theta_i = \arcsin\left(\frac{m\lambda_i}{T} - \sin\theta_w\right),$$

i.e., according to equation (2), where $\theta_i$ denotes an angle of the i-th incident light beam to normal, i=1, 2, 3, $\theta_w$ denotes an angle of the mixed-color light beam to normal, $\lambda_i$ denotes a wavelength of the i-th incident light beam, i=1, 2, 3, m denotes a diffractive order number, and T denotes a grating period of the grating surface.

The reflective diffractive grating surface may correspond to a reflective diffractive grating surface as described above with respect to FIG. 4, FIG. 5 and FIG. 6. The reflective diffractive grating surface may form a beam combining device 400 as described above with respect to FIG. 4.

The method 700 may be used to operate a laser scan pico-projector illumination part as described above with respect to FIG. 6. The reflective diffractive grating surface may be formed as described above with respect to FIG. 4 and FIG. 5.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the embodiment of the application beyond those described herein. While the present embodiment of the application has been described with reference to one or more particular embodiments, those skilled in the art recognize that many changes may be made thereto without departing from the scope of the present embodiment of the application. It is therefore to be understood that within the scope of the appended claims and their equivalents, the embodiment of the application may be practiced otherwise than as described herein.

What is claimed is:

1. A beam combining device, comprising:
a reflective diffractive grating surface configured to combine a first incident light beam, a second incident light beam and a third incident light beam into a single diffracted mixed-color light beam when impinging on the reflective diffractive grating surface,
wherein the first incident light beam, the second incident light beam, and the third light beam are different colors,
wherein a profile of the grating surface is configured according to an optimization criterion with respect to a diffraction efficiency, and
wherein the optimization criterion is based on at least one of: angles of the first incident light beam, the second incident light beam, and the third incident light beam to a normal; an angle of the diffracted light beam to normal; wavelengths of the first incident light beam, the second incident light beam, and the third incident light beam; a diffractive order number; and a grating period of the grating surface.

2. The beam combining device of claim 1, wherein the reflective diffractive grating surface comprises a blazed grating.

3. The beam combining device of claim 2, wherein the blazed grating comprises grooves having an asymmetric triangular form.

4. The beam combining device of claim 1, wherein the reflective diffractive grating surface comprises a sub-wavelength grating.

5. The beam combining device of claim 4, wherein the sub-wavelength grating comprises grooves arranged on the grating surface with a period of less than a wavelength of one of the first incident light beam, the second incident light beam, or the third incident light beam.

6. The beam combining device of claim 5, wherein the grooves of the sub-wavelength grating have a symmetric triangular form.

7. The beam combining device of claim 5, wherein the grooves of the sub-wavelength grating have a sinusoidal form.

8. The beam combining device of claim 1, wherein the grating surface comprises a reflective metal layer covering the grating surface.

9. The beam combining device of claim 1, wherein the profile of the grating surface is concave.

10. The beam combining device of claim 1, wherein the optimization criterion is based on the relation:

$$\sin\theta_i + \sin\theta_w = \frac{m\lambda_i}{T},$$

wherein $\theta_i$ denotes an angle of an i-th incident light beam to normal, wherein i is a positive integer, wherein $\theta_w$ denotes an angle of a diffracted light beam to a normal, wherein $\lambda_i$ denotes the wavelength of the i-th incident light beam, wherein m denotes the diffractive order number; and wherein T denotes the grating period of the grating surface.

11. The beam combining device of claim 10, wherein the diffractive order number (m) is equal to negative one.

12. The beam combining device of claim 1, wherein the grating period of the grating surface is approximately 2500 lines per millimeter.

13. The beam combining device of claim 1, wherein the wavelengths of the first incident light beam, the second incident light beam, and the third incident light beam correspond to wavelengths of a red laser light, a green laser light and blue laser light.

14. A laser scan pico-projector, comprising:
a first laser configured to generate a first incident light beam;
a second laser configured to generate a second incident light beam; and
a third laser configured to generate a third incident light beam,
wherein the first incident light beam, the second incident light beam, and the third incident light beam are different colors,
wherein the first laser, the second laser, and the third laser are arranged such that the first incident light beam, the second incident light beam, and the third incident light beam are directed to a reflective diffractive grating surface of a beam combining device,
wherein the reflective diffractive grating surface comprises a sub-wavelength grating, and
wherein the sub-wavelength grating comprises grooves arranged on the grating surface with a period of less than a wavelength of one of the first incident light beam, the second incident light beam, or the third incident light beam.

15. The laser scan pico-projector of claim 14, wherein the grooves of the sub-wavelength grating have a symmetric triangular form.

16. The laser scan pico-projector of claim 14, wherein the grooves of the sub-wavelength grating have a sinusoidal form.

17. The laser scan pico-projector of claim 14, wherein the grating surface comprises a reflective metal layer covering the grating surface.

18. The laser scan pico-projector of claim 14, wherein the profile of the grating surface is concave.

19. A method for generating a mixed-color light beam based on a combination of a first incident light beam, a second incident light beam and a third incident light beam, the method comprising:
arranging the first incident light beam, the second incident light beam, and the third incident light beam with respect to a reflective diffractive grating surface of a beam combining device, according to the relation:

$$\theta_i = \arcsin\left(\frac{m\lambda_i}{T} - \sin\theta_w\right),$$

wherein $\theta_i$ denotes an angle of an i-th incident light beam to normal, wherein i is a positive integer, wherein $\theta_w$ denotes an angle of a mixed-color light beam to a normal, wherein $\lambda_i$ denotes a wavelength of the i-th incident light beam, wherein m denotes a diffractive order number, and wherein T denotes a grating period of the grating surface.

* * * * *